United States Patent [19]
Scott et al.

[11] 3,894,859
[45] July 15, 1975

[54] METHOD OF THERMAL CONDITIONING OF MOLTEN GLASS PRIOR TO FORMING FLAT GLASS

[75] Inventors: Walter W. Scott, Carlisle; Leonard A. Knavish, Plum Borough, both of Pa.

[73] Assignee: PPG Industries, Inc., Pittsburgh, Pa.

[22] Filed: Dec. 6, 1973

[21] Appl. No.: 422,506

[52] U.S. Cl. ............. 65/65 A; 65/99 A; 65/137
[51] Int. Cl. ................... C03b 18/02; C03b 5/22
[58] Field of Search .......... 65/135, 136, 137, 65 A, 65/99 A, 337, 346

[56] References Cited
UNITED STATES PATENTS

| | | | |
|---|---|---|---|
| 1,980,344 | 11/1934 | Kinker | 65/337 X |
| 2,203,288 | 6/1940 | Willetts | 432/238 |
| 2,921,106 | 1/1960 | Arbeit | 65/136 |
| 3,531,274 | 9/1970 | Dickinson et al. | 65/65 A X |

Primary Examiner—Arthur D. Kellogg
Attorney, Agent, or Firm—E. Kears Pollock

[57] ABSTRACT

The central portion of a float glass ribbon formed according to this invention is free of the "center feature" that characterizes conventional float glass. Molten glass flowing through a refiner or conditioning section of a glassmaking furnace is asymmetrically cooled in order to angularly shift or skew flows within the molten glass; the glass is delivered through a narrow canal or passage from the refiner to a float forming chamber with the flows in the molten glass skewed; the resulting glass ribbon has a central region substantially free of the distortion that characterizes the central region of a conventional float ribbon.

9 Claims, 6 Drawing Figures

SHEET 1

Fig.1B THIS INVENTION ent pool of moltenglass residing 30 portion of the refiner and be discharged through the
METHOD OF THERMAL CONDITIONING OF MOLTEN GLASS PRIOR TO FORMING FLAT GLASS

BACKGROUND OF THE INVENTION

1. Field of the Invention

This invention relates to the manufacture of flat glass. More particularly, this invention provides improved methods and apparatus for conditioning molten glass for delivery to a float forming chamber to form a continuous ribbon of flat glass by the float method.

2. Description of the Prior Art

In the manufacture of flat glass, measured quantities of glassmaking ingredients are fed by a batch feeder into a fill doghouse of a glassmaking furnace. A typical furnace is a relatively long structure comprising a bottom, a back wall connected to which is a fill doghouse; a front wall at the opposite end of the long structure from the back wall through which there is generally an opening leading to apparatus for forming a continuous ribbon of flat glass; side walls joining the front and back wall with firing ports extending from each side wall in a melting section of the furnace and skim kilns or skim doghouses extending from the side walls, both in its melting section closest to the back wall and in a refiner or conditioning section closest to the front wall. Commonly, a drop arch separates the melting section from the refiner, with the drop arch extending downwardly from a roof which joins the walls of the furnace and provides a headspace above molten glass residing within the furnace.

Batch ingredients are continuously or intermittently fed to the fill doghouse and, being lighter than molten glass, float upon molten glass within the furnace. Heat is applied to these batch ingredients, generally by burning a hydrocarbon fuel in the headspace of the melter above the batch ingredients. This causes the batch ingredients to react and melt joining into the molten glass upon which they are floating. Molten glass flows generally from the melting region into and through the refiner to the discharge opening in the front wall.

In the refiner, the glass is allowed to cool gradually and to lose dissolved gases and volatile impurities. Natural cooling occurs due to radiation of heat from the upper exposed surface of the molten glass to the roof of the refiner and to the upper portions of the walls of the refiner. Heat is conducted from the molten glass through the lower portion or basin wall portion of the side walls, through the bottom and through the front wall below the discharge opening. Forced heat removal may be accomplished by blowing air into the headspace above the molten glass, by inserting coolers into the molten glass or by disposing radiation sink coolers into the headspace extending over the molten glass.

The rate of heat removal from the molten glass through the bottom of the furnace may be enhanced by cooling the bottom of the furnace in the manner described in U.S. Pat. No. 3,776,710 and entitled "Apparatus for Refining Glass." This patent teaches cooling substantially the entire bottom of the refiner of a furnace while protecting the bottom of the melting section of the furnace from such cooling. This improves flow stability within the refiner and prevents the development of random striations within the finished glass product.

In a conventional glassmaking furnace for melting and conditioning glass to prepare it for forming glass by a float forming method, the refiner width is about 10 times the width of the discharge opening in the front wall through which the molten glass flows to the float forming chamber. Connected to the furnace at this discharge opening is a passage or canal leading from the furnace to a float forming chamber. Molten glass flows into the canal and over a lip at the downstream end of the canal. From there the molten glass falls downwardly onto a pool of molten metal, usually tin, and spreads outwardly and rearwardly as well as in a forward manner on the molten tin.

Once on the molten tin, the molten glass spreads outwardly in an unhindered manner until it reaches a near equilibrium thickness and width. A continuous ribbon of glass is drawn downstream through the float forming chamber on the surface of the molten tin. In general, the ribbon of glass is drawn both thinner and narrower as it passes through the float forming chamber and is cooled to form a dimensionally stable continuous ribbon of glass.

Typically, the width of the canal or passageway connecting the refiner with the float forming bath is about one-tenth of the width of the refiner. For example, a typical refiner may be about 360 inches wide, and a related discharge opening and canal may be about 40 inches wide. Glass that is flowing downstream through the refiner, particularly between the central part of the refiner and the outer side walls, must flow inwardly near the front wall to join glass flowing in the central portion of the refiner and be discharged through the opening in the front wall and through the canal onto the molten metal in the float forming chamber. Glass produced by conventional float processes is characterized by a "center feature," which is a pronounced pattern at or near the center of a ribbon of float glass when viewed in cross section. Corresponding to this center feature is a region of optical distortion extending along the ribbon of glass at or near its centerline. This region of optical distortion is apparent when the glass is viewed through its thickness in a conventional manner.

The present invention provides apparatus and methods for substantially eliminating the characteristic central distortion and center feature found in float glass. This invention will be understood from the description which follows.

SUMMARY OF THE INVENTION

A ribbon of flat glass is produced by series of steps. Raw materials are melted to form a pool of molten glass within a glassmaking furnace. The molten glass is refined by being gradually cooled and caused to flow in a pool through a portion of the glassmaking furnace characterized as a refiner. Refined molten glass is discharged from the refiner through an opening in a wall of the refiner and flows through a passage or canal to a forming chamber. There the molten glass is cooled and attenuated to form a dimensionally stable ribbon of glass. The step of forming is generally carried out by a float process by pouring molten glass downwardly onto a pool of molten metal, allowing the molten glass to spread outwardly on the pool of molten metal, and drawing a continuous ribbon of glass along the surface of molten metal from the puddle or layer of molten glass so formed. Such molten glass delivery and glass ribbon forming steps are described in detail in U.S. Pat. No. 3,083,551 and U.S. Pat. No. 3,220,816, the detailed descriptions thereof being incorporated by reference herein. Other forming techniques may be employed although the principal benefits gained through the practice of this invention are most dramatic when the practice of the invention is carried out in conjunction with a float forming process.

The glass making furnace from which this glass ribbon is produced is operated in accordance with this invention in order to eliminate the characteristic "center feature" which would otherwise exist in the ribbon of glass produced.

Glass batch ingredients are fed to a glassmaking furnace having a melting region of conventional design that is heated in a conventional manner. The molten glass then flows from the melting region of the glassmaking furnace into and through its refiner and then into and through a connecting passageway or enclosed canal to a conventional float forming chamber such as described in U.S. Pat. No. 3,083,551 and U.S. Pat. No. 3,220,816, already mentioned and herein incorporated by reference. While the molten glass flows through the refiner, it is thermally conditioned to substantially eliminate the "center feature" which is characteristic of conventional float glass.

In a conventional glassmaking operation in which flat glass is formed by the float process, the refining portion of the glass melting furnace immediately upstream of the canal for delivering molten glass to the forming chamber has a width about ten times the width of the canal. The glass flowing downstream through the refiner toward the canal has a characteristic flow pattern generally attributed to the geometry and relative sizes of refiners and canals conventionally employed in such glassmaking operations. Although the applicants do not intend to limit their invention to the establishment of specific improvements in glass flow patterns within a refiner, the present invention may be appreciated by describing the general effect of its practice upon typical glass flows in a refiner.

Glass at the surface of the pool of molten glass in the refiner flows downstream from the melting portion of the furnace toward the canal. Except for a small region immediately upstream of the canal, the glass flow at the surface diverges slightly in the upstream portion of the refiner and then converges slightly in the downstream portion of the refiner due to the relationship of throughput flows and convection flows in the refiner. Beneath the surface of the glass in the vicinity of a neutral flow plane there are corresponding converging and diverging flows due to conservation of mass.

Considering first flow streamlines along the centerline of the refiner, the glass along the centerline flows in a generally unidirectional manner downstream to the entrance of the canal and on through the canal. This is so, not only at the surface of the pool of molten glass, but also beneath the surface to a depth of about one-third of the total depth of molten glass. The velocity of the molten glass gradually decreases with increasing depth beneath the surface until a return flow is encountered. The boundary between downstream or forward flow and return flow is characterized as a neutral flow plane.

Considering next flow streamlines to either side of the entrance into the canal, the glass to both sides of the refiner flows in a symmetric fashion downstream toward the front wall of the refiner then the glass flow turns inwardly toward the centerline of the refiner. The glass flow, depending upon its specific location in the refiner, turns from a few degrees to more than 90° inward then ultimately turns in a downstream direction toward the canal. By following two streamlines of glass flow equidistant from the centerline and sufficiently outward from the centerline to turn more than 90°, it is apparent that such streamlines are symmetric and cause a cumulative effect upon downstream flow in the vicinity of the neutral flow plane. This reversal and cumulation of glass flow is now believed to cause disturbances of flow streamlines near the centerline causing the "center feature" that characterizes float glass. These flow patterns are found to cause elements of glass in the bottom center of a finished ribbon of glass to have a greater variation in residence time in the furnace than elements of glass in any other confined portion of the ribbon of glass.

In the practice of this invention the glass flow in the refiner is skewed. That is, the generally downstream or longitudinal flow is caused to shift angularly with respect to the centerline of the refiner. Such an angular shift constitutes a lateral shift of glass flow from its general downstream or longitudinal path. An angular shift of from 2° to 15° is satisfactory with a shift of about 5° usually sufficient to substantially eliminate the characteristic "center feature" from the glass produced. The angular shift may be toward either side of the refiner with the angular shift occurring at and below the surface of the pool of molten glass and at and on both sides of the centerline of the refiner.

Heat is removed from the molten glass on one side of the refiner in a region extending upstream from the front wall on that side of the refiner by cooling the glass from above. Meanwhile, heat is removed from the molten glass flowing in the other side of the refiner by cooling the glass from below and removing substantially less heat from the glass from above than is removed from the glass on the first side of the refiner from above. Such asymmetric cooling of the molten glass flowing through the refiner towards the canal causes the forward or downstream flows within the molten glass to become skewed. As a result, the "center feature" in the glass produced becomes skewed and eventually disappears.

By skewing or angularly shifting the glass flow in the refiner, the inward flow of glass from one side of the canal is greater than from the other side of the canal. This apparently rotates or turns the flow of glass along the centerline of the refiner into the canal, and as a result the "center feature" is weakened in intensity and skewed in orientation until it practically disappears. Although a characteristic pattern remains in the glass, it is one that is not observable as a region of optical distortion when the glass is observed through its thickness in the ordinary manner.

Molten glass flowing through a refiner may be asymmetrically cooled by merely extending one or more overhead coolers into the headspace of the refiner on only one side of the refiner. The headspace is, of course, the space in a glassmaking furnace above the surface of a pool of molten glass. Alternatively, asymmetric cooling may be provided by extending one or more overhead coolers to a greater extent into the headspace over the molten glass on one side of the refiner than similar coolers are extended into the headspace over the molten glass on the other side of the refiner. For example, in a glassmaking furnace having a series of skim kilns extendig outwardly from the side walls on each side of its refiner, overhead coolers may be extended into the headspace on one side of the refiner through each of the skim kilns on that side with no coolers extending into the headspace through the skim kilns on the opposite side.

The overhead coolers employed in the practice of this invention may be conventional hairpin coolers, each comprising a single bent tube or pipe through which a coolant, such as water, may be directed when the cooler is suspended in the headspace over the molten glass. Such coolers are commonly mounted on movable cantilever mountings to permit their extension into the headspace over the molten glass and to permit the adjustment of the extent of insertion of such coolers into the furnace. Other cooler designs may also be employed, such as, for example, a double concentric pipe cooler design, wherein coolant may be caused to flow toward the center of the tank in an inner pipe then out to an annular space between the pipes to return to a discharge conduit connected to the annular space outside the furnace.

In order to ensure that substantially more heat is removed from the top of the glass on one side of the furnace where the coolers are positioned, it is preferred that additional insulation be provided beneath the furnace floor in the vicinity of the overhead coolers so that the resistance to heat transfer from the glass to and through the floor to the outside environment is increased.

It is possible to enhance the asymmetric cooling already described by providing a region beneath the floor of the refiner on the opposite side of the refiner from where overhead cooling is provided which is provided with additional cooling in a manner after that described for overall refiner bottom cooling in U.S. Pat. No. 3,776,710.

A portion of the bottom of the furnace that is to be cooled from the bottom is isolated from the rest of the furnace bottom by a barrier, such as a wall or a drape. Preferably a drape, such as a flexible asbestos drape, is suspended from the bottom of the furnace and extends downwardly from it to separate the space below the furnace into two portions, one portion beneath the side of the furnace that is to have increased cooling from the bottom and another portion beneath the furnace that is to have cooling from the bottom maintained or diminished by the installation of additional insulation thereon. A fan or blower may be employed to direct cooling air against the bottom of the furnace on the side of the refiner which is to have increased cooling of the molten glass from the bottom.

Alternatively, increased bottom cooling may be provided from one side of the furnace by placing water pads against the bottom of the furnace, by providing coolant pipes in the refractory bottom of the furnace itself or by providing submerged coolers adjacent or near the bottom of the furnace in the molten glass on that side of the refiner.

In order to diminish cooling from above the molten glass on one side of the furnace opposite from that where top cooling is encouraged, it is possible to provide additional insulation about the basin wall portion of the side wall of the furnace. It is possible, though usually not necessary, to further discourage top cooling on that side of the refiner by providing a suspended radiation shield above the molten glass on that side of the furnace. This may be provided by suspending a false roof of heat-resistant refractory material above the molten glass on that side of the furnace in relatively close proximity to the exposed surface of the molten glass.

This invention will be further understood with reference to the accompanying drawings which form a part of this application.

BRIEF DESCRIPTION OF THE DRAWINGS

FIG. 1b is a representation of an enlarged cross-sectional view of a center section of glass formed by the float method from molten glass thermally conditioned according to this invention prior to delivery to a float forming bath;

DESCRIPTION OF THE PREFERRED EMBODIMENTS

Figure 1A:
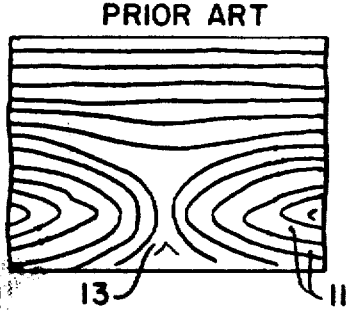
FIG. 1a is a representation of an enlarged cross section of the center portion of a conventional sheet of glass formed by the float method.

FIGS. 1a and 1b are representations of the internal quality of float glass produced according to the prior art and float glass produced from molten glass that has been thermally conditioned according to this invention. These drawings are representations of photographs called striagrams that are made in the following manner. Specimens of glass are cut from a sheet of glass with a cut run perpendicular to the edge of the ribbon of glass and extending across the width of the ribbon. Two transverse cuts are generally made 2 to 4 inches apart to produce a narrow specimen representing a full width cross section of a ribbon of glass. A smaller specimen is cut from the central portion of the full width specimen. The smaller portion is about 1 to 2 feet in length with its centerline near the centerline of the full width specimen. This speciment of glass is immersed in an oil having about the same index of refraction as the glass. The glass is positioned with its top and bottom surfaces in planes that are substantially horizontal and with its cut edges substantially parallel to a traversing path of a camera. A camera is caused to traverse the length of the specimen along a predetermined path that is substantially parallel to the transverse cut edges of the specimen and substantially parallel to the planes of the top and bottom surfaces of the specimen. The specimen is backlighted with respect to the camera and the camera is focused on the midsection of the specimen. The surfaces of the specimen are not seen by the camera because of the presence of the matching index of refraction fluid in which the sample speciment is immersed. Thus, the image produced on film by the camera is a representation of the internal patterns of the observed glass specimen.

Flat glass produced according to conventional float forming techniques from molten glass conditioned in a conventional manner has a pronounced "center feature." Virtually all glass produced by all flat glass manufacturing techniques is characterized by striations or ream and this is represented in the accompanying drawings. Referring now to FIG. 1a, there is seen a representation of a center section of a conventional float glass ribbon. Apparent in the glass are striations 11; these are known in the art as ream. Also apparent is a region of complete striation turnaround, which is characterized as the "center feature" 13 of float glass. This generally occurs in the bottom portion of a ribbon of glass as it is formed. Such float glass, when viewed through its thickness in the conventional manner, has a charateristic region of persistent optical distortion corresponding in location to the "center feature" that is observed in the cross-sectional view.

Referring now to FIG. 1b, there is seen the striations 11 or ream common to all flat glass. There is also an apparent skewed striation 15 in place of the "center feature" that is so pronounced in conventional float glass. When viewing this glass in a conventional manner through the glass, there is no apparent optical distortion.

Figure 2:
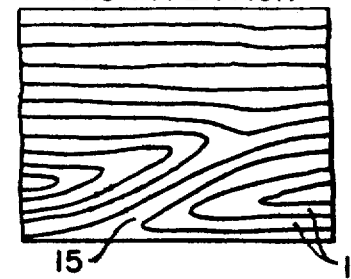
FIG. 2 is a schematic plan view of a refiner of a glass-making furnace according to this invention.
Figure 2:
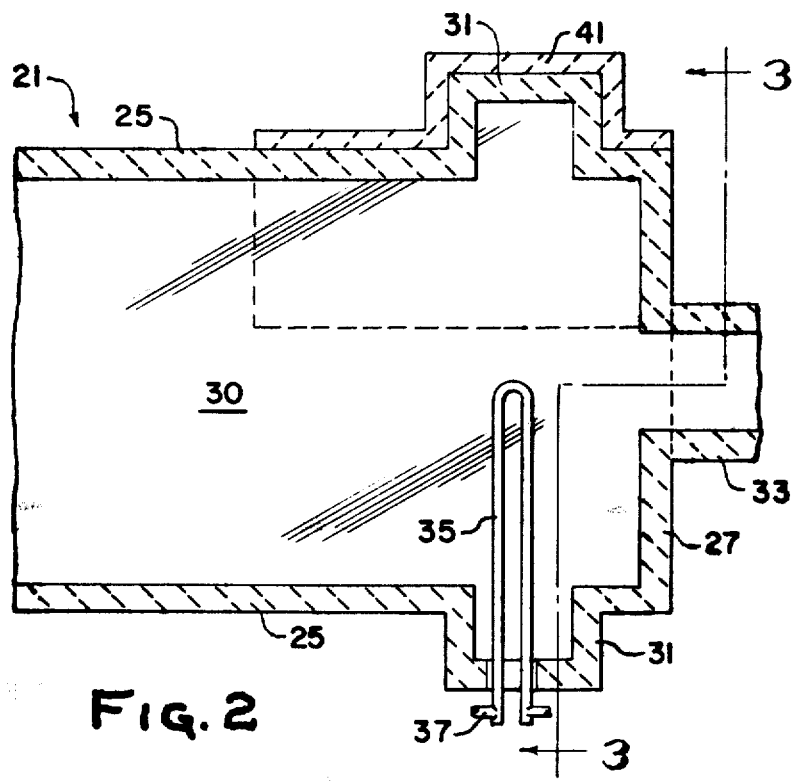
Figure 3:
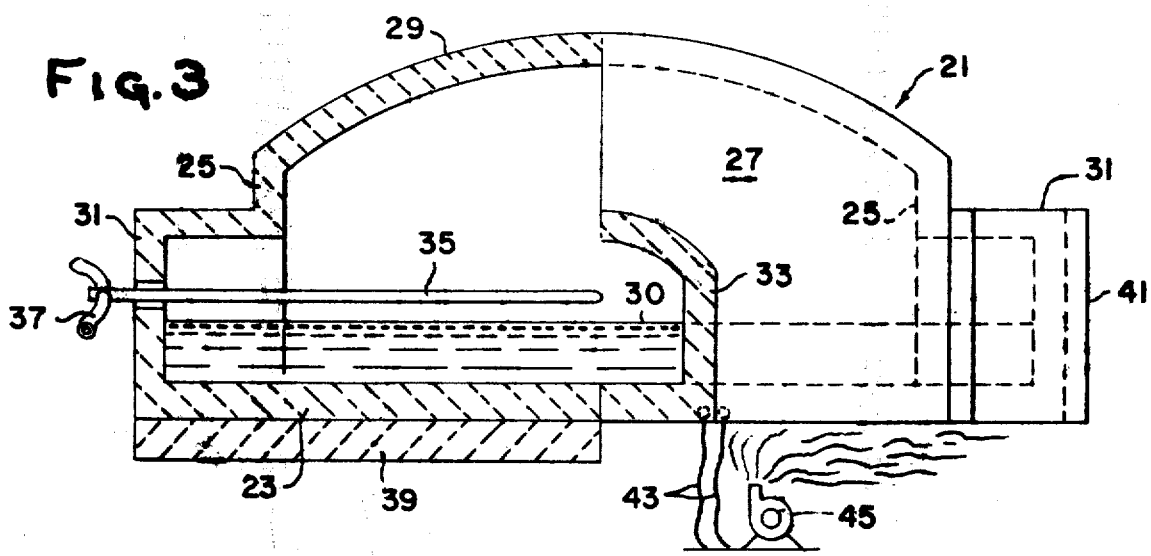
FIG. 3 is a schematic elevational cross section of a refiner employed in the practice of this invention taken along section line 3—3 of FIG. 2.

Preferred apparatus employed to carry out the method of the present invention is shown in FIGS. 2 and 3. A glassmaking furnace is provided with a refiner 21 comprising a bottom 23 made of refractory material and side walls 25, also made of refractory material. The side walls include a lower basin wall portion 26 defined as that portion extending from the bottom to just above the normal level of molten glass in the furnace and an upper wall portion. The basin wall portion is generally constructed of material which is more resistant to attack from molten glass then are conventional clay refractories.

The refiner 21 further includes a front wall 27 and a roof or crown 29 joining the side walls and front wall. A pool of molten glass 30 fills the refiner 21 to a predetermined and controlled level, and a headspace is provided above the molten glass. Skim kilns (skim doghouses) 31 extend outwardly from the side walls. During normal operation, some surface impurities floating on the molten glass are caused to drift into these skim kilns and accumulate there rather than passing out from the refiner and into the forming apparatus.

Connected to the refiner 21 through the front wall 27 is a canal or passage 33 which connects the refiner to a conventional float forming chamber and serves to convey molten glass from the refiner into the float forming chamber.

Extending into the headspace of the refiner on only one side of the refiner is an overhead cooler 35 which may generally be a hairpin cooler as shown. Connected to the overhead cooler 35 are flexible inlet and outlet coolant conduits 37 for connection to a source of cooling water and a drain or discharge for carrying away heated cooling water.

Disposed adjacent to the refiner bottom 23 may be additional insulation 39. This insulation is optional and is preferably confined to a portion of the refiner bottom extending beneath the side of the refiner where top cooling is to be enhanced.

Optional side wall insulation 41 is provided about the side walls on the opposite side of the refiner 21 from where the overhead cooler 35 is positioned. This optional side wall insulation 41 may extend over only the basin wall portion of the side walls or may extend upwardly over the entire side wall.

A heat transfer barrier 43 may be disposed along the bottom of the refiner 21 to segregate the space beneath the refiner into a portion beneath the side of the refiner that is to have increased top cooling from the space beneath the side of the refiner that is to have cooling from the top and bottom maintained or cooling from the bottom enhanced relative to cooling from the top. A suitable thermal barrier 43 comprises one or more flexible drapes or curtains depending from the bottom of the refiner 21 substantially along the centerline of the refiner or to one side of the canal along the refiner, as shown in FIGS. 2 and 3.

Additional cooling may optionally be provided along the bottom of the refiner on the opposite side of the refiner from where increased top cooling is provided. Such cooling may be provided by placing a fan or blower 45 in the space beneath the refiner and directing air against the bottom of the refiner. Such forced cooling should preferably be carried out only when heat transfer barriers 43 are provided in the manner described and shown, for otherwise additional cooling of the side of the refiner that is to have increased top cooling will occur.

Figure 4:
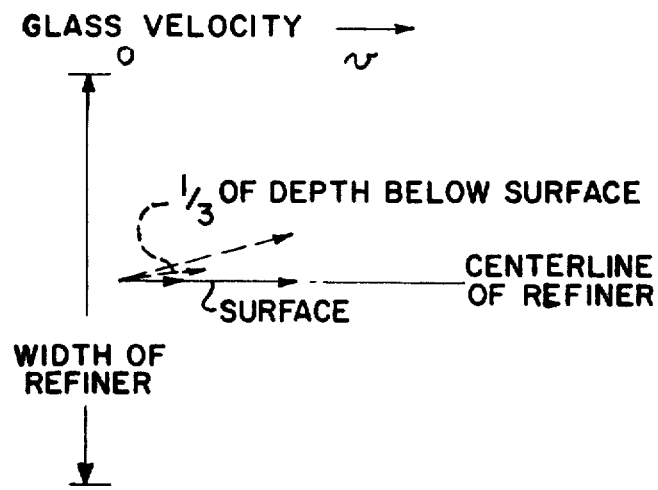
FIG. 4 is a schematic plan view of glass flow streamlines (in vector form) in a refiner showing conventional flows as well as flows generally obtained when practicing this invention.

Referring now to FIG. 4, the apparent skewing or angular shifting of glass flows that occurs during the practice of this invention may be appreciated. Along the refiner centerline, both at the surface and at a depth slightly less than one-third of the pool depth beneath the surface, glass flows typical for conventional glassmaking are conveniently described as flow streamlines represented by vectors. These representative vectors are aligned in a parallel fashion along the centerline of the refiner. The vector representing surface flow is longer than the vector representing subsurface since the glass at the surface is flowing most rapidly toward the canal for delivery to the forming chamber. This relationship of relative magnitudes of the representative flow vectors is inherent for flow in a pool since the surface fluid (glass) encounters less resistance to flow than fluid (glass) beneath the surface.

Upon imposition of the asymmetric cooling described above, the flows become skewed or angularly shifted toward one side of the refiner. The angular shift is toward the side of relatively greater top cooling. As seen in FIG. 4, the flows as represented by the angularly disposed vectors maintain their magnitude but are noticeably shifted.

As a result an effective rotation of centerline flow is effected, and this is maintained in the apparent rotation and reduction in intensity of the center pattern of glass being produced. The "center feature" normally generated in the glass is thus substantially eliminated.

Figure 5:
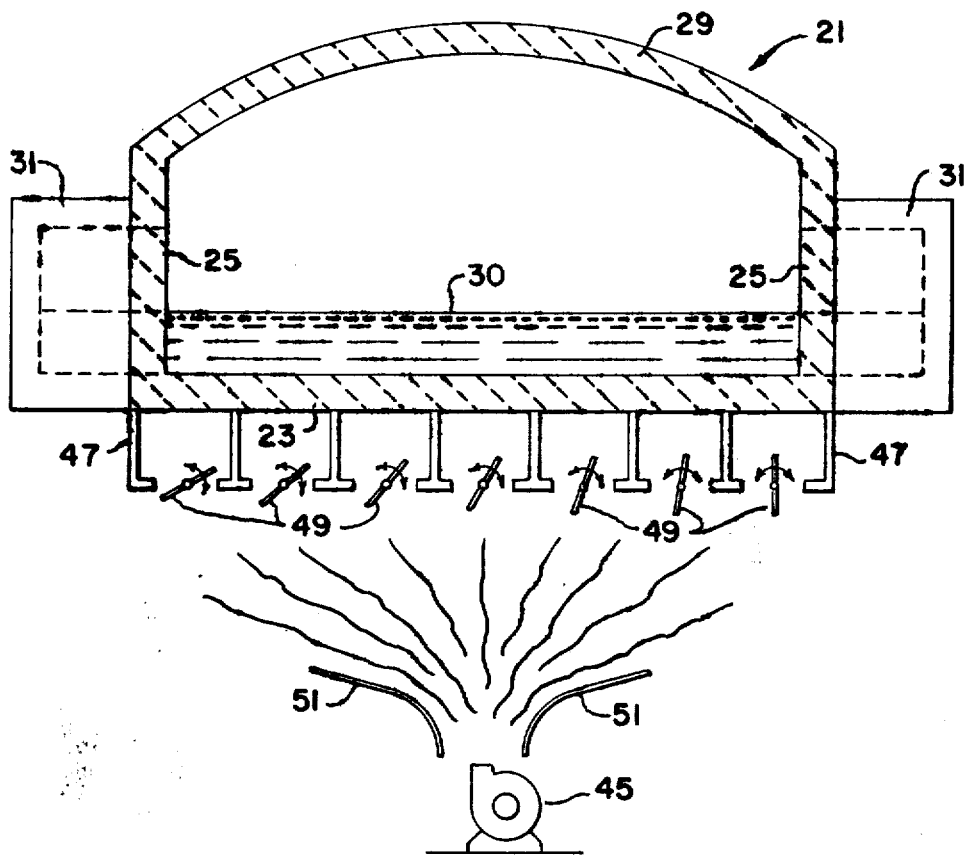
FIG. 5 is a schematic elevational cross section of a refiner employed in the practice of this invention. This embodiment of the invention is an alternative to that shown in FIG. 3 and the view in FIG. 5 is analogous to that of FIG. 3.

In addition to the preferred apparatus for carrying out the practice of this invention other means for causing asymmetric cooling may be used. For example, a second embodiment of this invention is shown in FIG. 5. A refiner 21 comprising a bottom 23, side walls 25; a roof 29 and other conventional structural elements contains a pool of molten glass 30; kilns 31 extend outwardly from the side walls 25 of the refiner.

A series of channel members 47 are disposed along the bottom 23 of the refiner 21. These channel members 47 segregate the space immediately beneath the refiner 21 into a series of longitudinal cooling chambers that are accessible from the space beneath them. Each combination of adjacent channel members 47 forming a cooling chamber is provided with a flapper or damper 49 which is adjustable to controllably vary the accessibility of a cooling chamber. Beneath the flappers 49 is a fan or blower 45, preferably provided with a diffuser 51 to distribute cooling gas or air toward all of the flappers 49. By opening the flappers on one side of the refiner to a greater degree than the flappers on the other side of the refiner, more bottom cooling is accomplished on one side than the other and as a result the glass flows are shifted in the desired manner.

The practice of this invention will be further understood from the Examples which follow.

EXAMPLE I

A continuous ribbon of flat glass is produced by float forming glass delivered to a conventional float forming chamber or bath from a glass furnace or tank. The glass is a soda-lime-silica glass and the continuous ribbon produced is about three-sixteenths inch thich and about 10 feet wide. The rate of production exceeds 400 tons of glass per day.

The refining portion of the furnace has an inside width of about 35 feet and a length of about 70 feet. A canal joins the furnace with the float forming chamber. The inside width of the canal and of an opening in the furnace front wall where it is connected to the furnace is about 40 inches. The glass depth in the refiner is about 45 inches. The furnace bottom comprises clay and alumina refractory materials having a combined thickness of about 20 inches.

Molten glass flows downstream through the refiner out through the front wall opening into the canal and on into the float forming chamber. The temperature of the molten glass entering the refiner from the melting portion of the furnace is from about 2,250° to about 2,350°F. as measured along the sides of the furnace using thermocouples encased in ceramic sheaths and immersed in the molten glass. The temperature of the molten glass near the entrance of the canal is from about 2,050° to about 2,150°F.

Located beneath the furnace floor is an open space or basement. A large blower or fan is located in this basement near the centerline of the furnace and just upstream of the canal beneath the refiner. A barrier is located between the space beneath the melter and the space beneath the refiner. This barrier is a curtain of asbestos cloth. The space beneath the refiner is commonly accessible with no barrier (other than those inherently provided by structural supports) subdividing this space. The entire refiner bottom is of substantially the same construction with no intended differences in thermal insulation throughout. During production the fan is operated to blow a continuous stream of cooling air against the refiner bottom in a generally upward and upstream direction. The cooling air flows along the refiner bottom toward the barrier and also flows outwardly toward the sides of the furnace where it is dispersed.

The glass produced is of generally high quality as would be expected from the teachings of U.S. Pat. No. 3,776,710 to L. A. Knavish and J. R. Schornhorst. Nevertheless, the "center feature" common to float glass persists in the center of the glass ribbon. The quality of the glass is evaluated in a quantitative manner by comparing samples of glass with pre-established standards as explained below. The ribbon, except for a single ream line near its center, has a ream grade average of about 1. The center of the ribbon of glass has a ream grade average of from 3 to 4, which indicates that the glass in this portion of the ribbon is not suitable for certain commercial uses. The glass has an internal appearance similar to that shown in FIG. 1a.

The ream grade of flat glass is determined in the following manner. Samples of glass are compared with standard samples representing a broad range of glass quality and each is assigned the grade of the standard to which it most closely corresponds. It has been found both convenient and adequate to employ a set of standards comprising eight standard samples with the sample having no visually evident ream line being designated as glass having a grade of 0 and the sample having an intense line of optical distortion that is offensive even to the untrained eye as glass having a grade of 7.

It is possible, using an incandescent lamp, to project light through either the standard samples or through glass to be evaluated and then onto a screen. Optical distortion lines caused by ream in the glass are projected as shadows on the screen. The intensity of these shadows relative to the projected background light correlates directly with the visual offensiveness of observed ream when the glass is viewed directly. The intensity of projected shadows can be sensed quantitatively using a photoelectric device as described in U.S. Pat. No. 3,199,401 to G. E. Sleighter and J. S. Zabetakis. Standard samples, having visually uniformly spaced ream grades of 0 through 7 when evaluated in such a manner, yield a calibration curve of substantially semi-logarithmic response for voltage relative to ream grade. Such a detecting device is used to continuously monitor glass as it is produced and to generate ream grade averages for regions of the glass and for the whole ribbon of glass.

After the normal performance of the glass making process has been established, the practice of this invention is initiated.

A hairpin cooler comprising a three-inch diameter pipe is inserted into the headspace of the refiner through a kiln or doghouse on one side of the furnace about 10 feet upstream of the front wall. The cooler is inserted about 10 feet into the furnace. Water at about 85°F. is fed to the cooler at about 60–80 gallons per minute; it is discharged from the cooler at about 120°F. After a period of four hours and for as long thereafter as the process is observed, the glass produced has a ream grade average of less than 1 throughout its width including the center portion. The internal appearance of the glass is similar to that shown in FIG. 1b.

EXAMPLE II

The production of glass is continued as in Example I with a single cooler inserted in the headspace of the refiner. Thermal insulation comprising refractory blocks are positioned adjacent the basin wall of the furnace on its side opposite from the cooler. The ream grade average for the glass ribbon remains at about 1, but the incidence of occasional excursions above the average for glass near the center of the ribbon is reduced.

EXAMPLE III

The production of glass is continued as in Example I with a single cooler inserted in the headspace of the refiner. An asbestos curtain is hung from the bottom of the refiner along its length near its centerline just toward the side of the refiner where the cooler is located. The fan is turned to direct cooling air more forcefully toward the bottom of the refiner on the side opposite to that where the cooler is located. The glass produced has a ream grade average slightly below 1 and excursions above that are practically eliminated. The internal quality of the glass is similar to that shown in FIG. 1*b*.

While this invention has been described with particular reference to specific embodiments, those skilled in the art will recognize obvious variants of the disclosed invention such as its applicability to the production of glass of any composition. Thus, the applicants do not intend this description to be construed as limiting the scope of their invention which they now claim.

What is claimed is:

1. In the method of making flat glass by melting raw materials to form molten glass, refining the molten glass by gradually cooling it while flowing it longitudinally through a refiner along an established path, discharging the refined molten glass into a forming chamber and onto a bath of molten metal by causing it to flow through a passage having a narrower cross section than the refiner connecting the refiner with the forming chamber and thereafter cooling and attenuating the glass to form a dimensionally stable ribbon of flat glass having substantial optical distortion in the location of the center of the ribbon, the improvement comprising
   a. cooling a first portion of the molten glass in one side of the refiner extending to one side of the connecting passage substantially immediately before discharge from the refiner by removing relatively more heat from said first portion of molten glass from above it than is removed from a second portion of molten glass in the opposite side of the refiner, while cooling both portions of molten glass sufficiently to deliver the molten glass to the forming chamber at a temperature suitable for forming a ribbon of flat glass, and
   b. controlling said relatively more heat removal from above said first portion of molten glass to be sufficient to cause a lateral shift of 2° to 15° of glass flow adjacent the surface of the molten glass, such shift being from the established path of longitudinal glass flow, whereby the glass produced is characterized by substantially uniform low optical distortion across a major portion of the width of the ribbon.

2. The method according to claim 1 wherein said first portion of glass is cooled from above by extending a cooler into the refiner headspace above said first portion of molten glass and supplying a coolant to said cooler.

3. The method according to claim 1 further comprising
   cooling said second portion of molten glass substantially immediately before discharge from the refiner by removing relatively more heat from said second portion of molten glass from below than is removed from said first portion of molten glass from below.

4. The method according to claim 3 wherein said first portion of molten glass is force cooled from above while heat removal from beneath said first portion of glass is substantially diminished; and wherein cooling of said second portion of molten glass is substantially increased from below by providing forced cooling of the bottom of said refiner beneath said second portion of molten glass.

5. The method according to claim 4 wherein said first portion of molten glass is cooled from above by extending a cooler into the refiner headspace above said first portion of molten glass and supplying coolant to said cooler.

6. The method according to claim 4 wherein said heat removal from beneath said first portion of molten glass is substantially diminished by providing thermal insulation adjacent the bottom of said refiner beneath said first portion of molten glass.

7. The method according to claim 4 wherein said forced cooling is provided beneath said second portion of molten glass by directing a flow of air against the bottom of said refiner beneath said second portion of molten glass and by at least partially shielding the bottom of said refiner beneath said first portion of molten glass by disposing a barrier to said air flow beneath said refiner between one side of said refiner and the other side of said refiner.

8. In the method of making flat glass by melting raw materials to form molten glass, refining the molten glass by gradually cooling it while flowing it longitudinally through a refiner along an established path, discharging the refined molten glass into a forming chamber and onto a bath of molten metal by causing it to flow through a passage having a narrower cross section than the refiner connecting the refiner with the forming chamber and thereafter cooling and attenuating the glass to form a dimensionally stable ribbon of flat glass having optical distortion in the location of the center of the ribbon, the improvement comprising
   a. cooling said molten glass in said refiner by removing heat therefrom from the bottom of said molten glass substantially immediately before discharge from the refiner wherein more heat is removed from said molten glass on one side of said refiner than is removed from said molten glass on the other side of said refiner, while removing sufficient heat from both sides to cool the glass sufficiently for forming; and
   b. controlling said greater heat removal from one side to be sufficient to cause a lateral shift of 2° to 15° of glass flow adjacent the surface of the molten glass, such shift being from the established path of longitudinal glass flow, whereby the glass produced is characterized by substantially uniformly low optical distortion across a major portion of the width of the ribbon.

9. The method according to claim 8 wherein said cooling of molten glass by removing heat from the bottom thereof is accomplished by directing a coolant against the bottom of said refiner by directing relatively more coolant against one portion of the bottom of said refiner to one side of said refiner and directing relatively less coolant against another portion of the bottom of said refiner to the other side of said refiner.

* * * * *